United States Patent
Sohara

(10) Patent No.: US 8,833,884 B2
(45) Date of Patent: Sep. 16, 2014

(54) BRUSHLESS MOTOR DRIVING APPARATUS AND PRINTING APPARATUS INCLUDING BRUSHLESS MOTOR DRIVING APPARATUS

(75) Inventor: Yoshitsugu Sohara, Tokyo (JP)

(73) Assignee: Canon Kabushiki Kaisha, Tokyo (JP)

(*) Notice: Subject to any disclaimer, the term of this patent is extended or adjusted under 35 U.S.C. 154(b) by 113 days.

(21) Appl. No.: 13/556,000

(22) Filed: Jul. 23, 2012

(65) Prior Publication Data

US 2013/0050306 A1 Feb. 28, 2013

(30) Foreign Application Priority Data

Aug. 26, 2011 (JP) ................................ 2011-185248

(51) Int. Cl.
*B41J 29/38* (2006.01)
*H02P 6/16* (2006.01)
*B41J 29/02* (2006.01)

(52) U.S. Cl.
CPC . *B41J 29/38* (2013.01); *H02P 6/16* (2013.01); *B41J 29/02* (2013.01)
USPC ................................................ 347/5; 347/16

(58) Field of Classification Search
CPC .................. G05B 19/404; G05B 2219/45187; B41J 29/38
USPC .................................. 347/5, 16, 37, 101, 104
See application file for complete search history.

(56) References Cited

U.S. PATENT DOCUMENTS 7,176,649 B2 * 2/2007 Shoji et al. .................... 318/626

FOREIGN PATENT DOCUMENTS

JP 61-020232 5/1986
JP 2009-240041 10/2009

* cited by examiner

*Primary Examiner* — An Do
(74) *Attorney, Agent, or Firm* — Fitzpatrick, Cella, Harper & Scinto

(57) ABSTRACT

The operation accuracy of a printing unit is improved in a printing apparatus. To accomplish this, a motor driving apparatus includes a brushless motor having coils of a plurality of phases, and a plurality of detection units that output voltages in accordance with rotation of a rotor, a driving unit that drives the brushless motor by switching a current supply destination between the coils of the plurality of phases based on a control signal, and a generation unit that generates the control signal based on addition results of detection signals output from the plurality of detection units, and correction signals based on differences between a predetermined voltage corresponding to a rotation angle of the rotor and voltages corresponding to the rotation angle of the rotor that are obtained from the plurality of detection units.

8 Claims, 13 Drawing Sheets

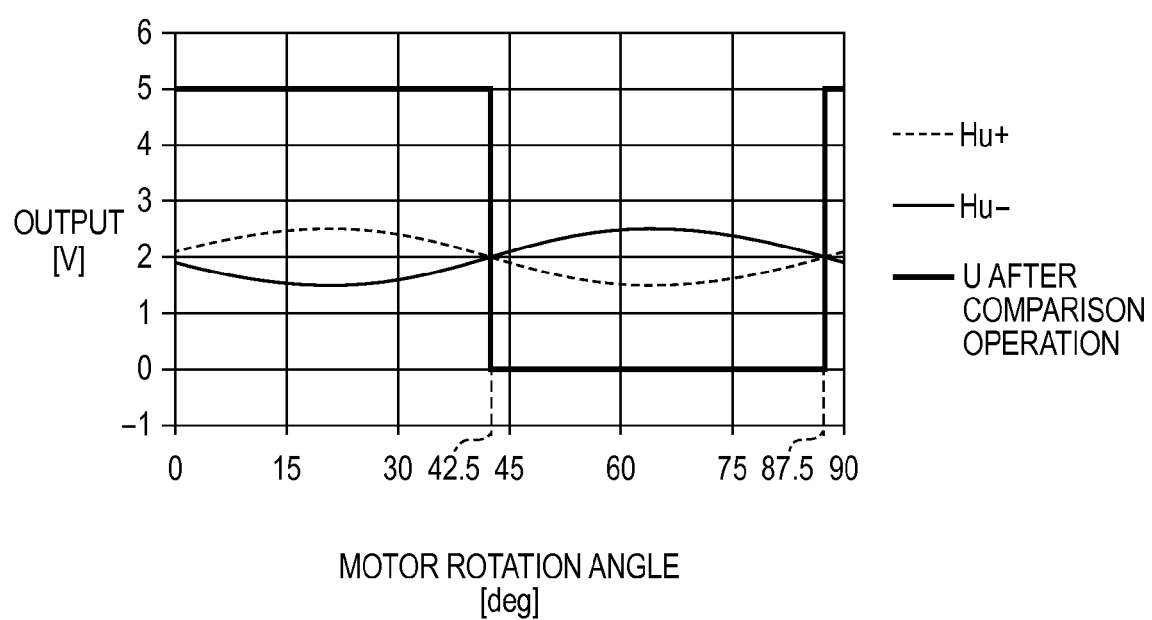
F I G. 5

BRUSHLESS MOTOR DRIVING APPARATUS AND PRINTING APPARATUS INCLUDING BRUSHLESS MOTOR DRIVING APPARATUS

BACKGROUND OF THE INVENTION

1. Field of the Invention

The present invention relates to a brushless motor driving apparatus and a printing apparatus including the brushless motor driving apparatus and, more particularly, to a DC brushless motor driving technique of driving a carriage on which a printhead is mounted.

2. Description of the Related Art

Recently, printing apparatuses require higher image qualities. Possible measures are, for example, to increase the printing medium conveyance accuracy, the printhead printing accuracy (for example, for an ink-jet printer, ink discharge amount and discharge timing), and the operation accuracy of the carriage on which the printhead is mounted.

Of these measures, attention is paid to the carriage operation accuracy. An ink-jet printer or the like simultaneously performs carriage operation control and printhead printing control, because the printhead prints while the carriage operates. Hence, the carriage operation accuracy, with respect to a control signal from the controller, affects the printing accuracy.

At present, the carriage often uses, as a driving source, a DC brushless motor which is quiet and which has a long service life. Hence, improvement of the operation accuracy of the DC brushless motor results in higher carriage operation accuracy and higher image quality of the printing apparatus.

A general DC brushless motor takes, for example, an arrangement as shown in FIG. 3. A plurality of (for example, three at every 120°) Hall elements arranged around a magnet (rotor) detect the magnetic pole of the rotating magnet. The obtained voltage is output to a motor driver, and driving of the rotor is controlled via coils based on outputs from the Hall elements. This arrangement has many error factors such as a Hall element mounting position error, an unbalanced voltage of the Hall element itself, the hysteresis of the Hall element itself, an offset of a differential amplifier input, the magnetization accuracy of the magnet, and the mechanical decentering of the rotor. To solve this problem, for example, Japanese Patent Publication No. 61-20232 and Japanese Patent Laid-Open No. 2009-240041 have been proposed.

The invention of Japanese Patent Publication No. 61-20232 pays attention to the error of the unbalanced voltage of the Hall element itself. One of the differential outputs of the Hall element is connected to GND or the power supply line so that the unbalanced voltage is corrected to be low.

In the invention of Japanese Patent Laid-Open No. 2009-240041, the Hall element switching position is estimated from the timing of an induced voltage generated in a coil.

The DC brushless motor inevitably generates errors, such as the dimensional tolerance between building components and the magnetization error of the rotor. In this situation, for example, when the mounting position of the Hall element itself shifts, the operation cannot be corrected by only correcting the unbalanced voltage of the Hall element, as in the invention of Japanese Patent Publication No. 61-20232.

In a printing apparatus, the carriage prints while frequently repeating acceleration and deceleration, and the DC brushless motor needs to be driven accurately even in acceleration/deceleration. However, when the Hall element switching position is estimated from the timing of an induced voltage generated in a coil, as in the invention of Japanese Patent Laid-Open No. 2009-240041, correction accuracy obtained from the estimation becomes poor in a driving form in which acceleration and deceleration are repeated frequently.

SUMMARY OF THE INVENTION

The present invention enables the realization of accurately correcting a motor driving error and improving the carriage operation accuracy even upon the shift of the mounting position of a Hall element itself or in a driving form in which acceleration and deceleration are repeated frequently.

According to one aspect of the present invention, there is provided a motor driving apparatus comprising: a brushless motor including coils of a plurality of phases, and a plurality of detection units that output voltages in accordance with rotation of a rotor; a driving unit that drives the brushless motor by switching a current supply destination between the coils of the plurality of phases based on a control signal; and a generation unit that generates the control signal based on addition results of detection signals output from the plurality of detection units, and correction signals based on differences between a predetermined voltage corresponding to a rotation angle of the rotor and voltages corresponding to the rotation angle of the rotor that are obtained from the plurality of detection units.

Further features of the present invention will be apparent from the following description of exemplary embodiments with reference to the attached drawings.

BRIEF DESCRIPTION OF THE DRAWINGS

FIG. 5 is a waveform chart showing a conventional Hall element output (one-phase display);

DESCRIPTION OF THE EMBODIMENTS

Figure 1:
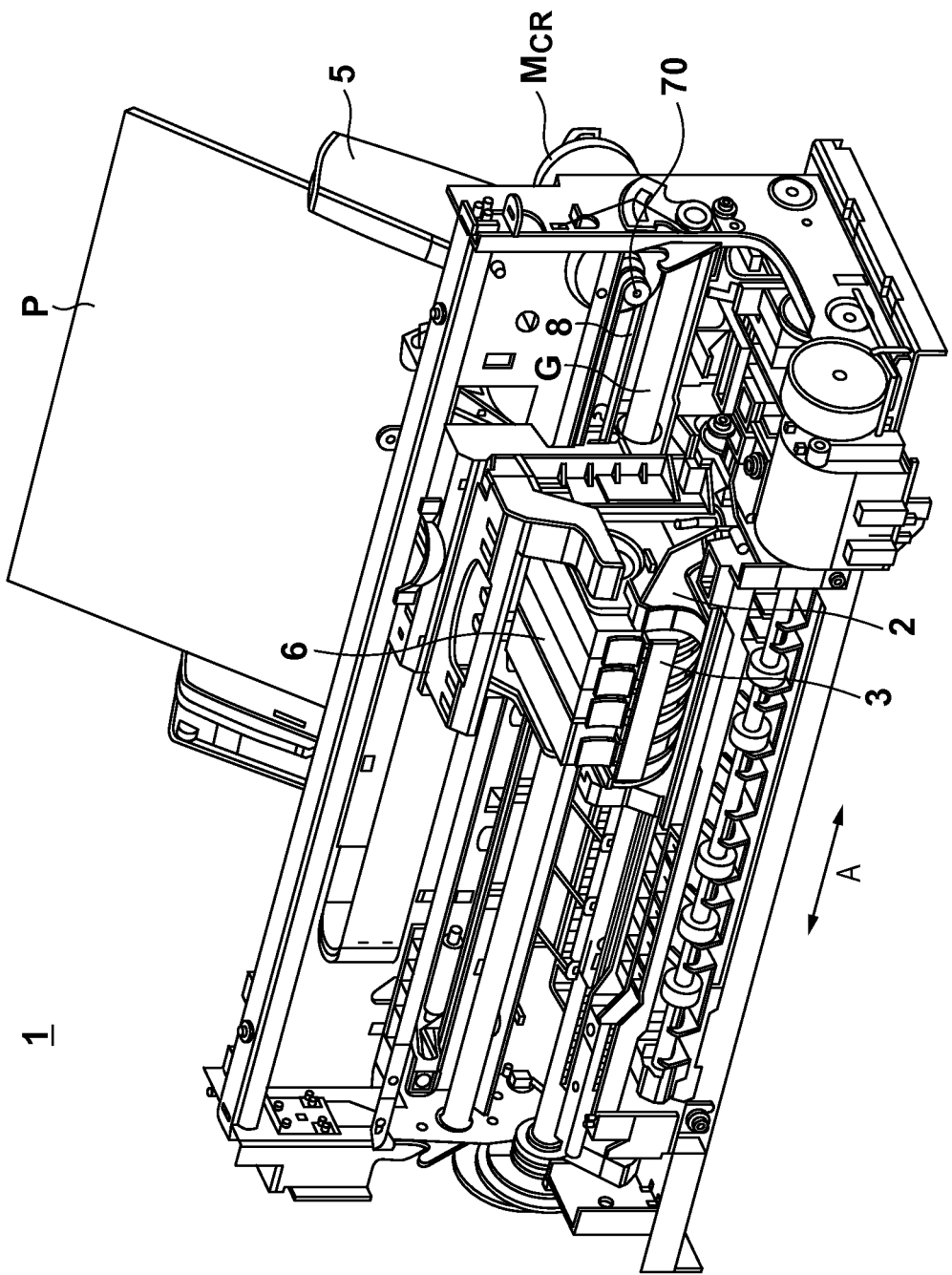
FIG. 1 is a perspective view showing an ink-jet printing apparatus according to an embodiment of the present invention.

Embodiments of the present invention will now be described in detail with reference to the drawings. It should be noted that the relative arrangement of the components, the numerical expressions and numerical values set forth in these embodiments do not limit the scope of the present invention unless it is specifically stated otherwise.

A printing apparatus using an ink-jet printing system will be exemplified. The printing apparatus may be, for example, a single-function printer having only the printing function, or a multifunction printer having a plurality of functions including the printing function, FAX function, and scanner function. Also, the printing apparatus may be, for example, a manufacturing apparatus used to manufacture a color filter, electronic device, optical device, micro-structure, and the like using a predetermined printing system.

In the following description, "printing" not only includes the formation of significant information such as characters and graphics, but also broadly includes the formation of images, figures, patterns, structures, and the like on a printing medium, or the processing of the medium, regardless of whether they are significant or insignificant and whether they are so visualized as to be visually perceivable by humans.

Also, "printing medium" not only includes paper used in a general printing apparatus, but also broadly includes ink-acceptable materials such as cloth, a plastic film, metal plate, glass, ceramics, resin, wood, and leather.

Further, "ink" should be extensively interpreted similar to the definition of "printing" described above. That is, "ink" includes a liquid which, when applied onto a printing medium, can form images, figures, patterns, and the like, can process a printing medium, and can process ink (for example, solidify or insolubilize a coloring agent contained in ink applied to a printing medium).

In the following description, the same reference numerals denote the same parts, and a repetitive description thereof will be omitted.

<Overall Arrangement of Ink-jet Printing Apparatus>

FIG. 1 is a perspective view exemplifying the outer arrangement of an ink-jet printing apparatus 1 according to an embodiment of the present invention.

In the ink-jet printing apparatus (to be referred to as a printing apparatus hereinafter) 1, an ink-jet printhead (to be referred to as a printhead hereinafter) 3 which prints by discharging ink according to the ink-jet system is mounted on a carriage 2. A guide shaft G supports the carriage 2 so that the carriage 2 can reciprocate in predetermined directions (directions indicated by an arrow A). A carriage motor $M_{CR}$ is a DC brushless motor which drives the carriage 2, and includes a rotating shaft perpendicular to the guide shaft G. A pulley 8 is connected to the carriage 2, and is in contact with the outer surface of a shaft member 70 of the carriage motor $M_{CR}$. When the carriage motor $M_{CR}$ rotates, the driving force is transferred to the carriage 2 via the pulley 8 to move the carriage 2.

The printing apparatus 1 feeds a printing medium such as printing paper via a paper feed mechanism, and conveys it to a printing position. At the printing position, the printhead 3 mounted on the carriage 2 discharges ink to a printing medium P, thereby printing.

The printhead 3 according to the embodiment adopts an ink-jet system which discharges ink using thermal energy. For this purpose, the printhead 3 includes heat generation elements. The heat generation elements are arranged in correspondence with respective orifices. A pulse voltage is applied to a corresponding heat generation element in accordance with a printing signal, thereby discharging ink from a corresponding orifice. As the ink discharge system, the embodiment will explain a case in which ink is discharged using heaters. However, the present invention is not limited to this, and may employ various ink-jet systems such as a system using piezoelectric elements, a system using electrostatic elements, and a system using MEMS elements.

For example, an ink tank 6 is mounted on the carriage 2, in addition to the printhead 3. The ink tank 6 stores ink to be supplied to the printhead 3. In the printing apparatus 1 shown in FIG. 1, five ink tanks 6 which store mat black (MBk), magenta (M), cyan (C), yellow (Y), and black (K) inks, respectively, are mounted on the carriage 2. The five ink tanks 6 are independently detachable.

<Functional Arrangement of Ink-jet Printing Apparatus>

Figure 2:
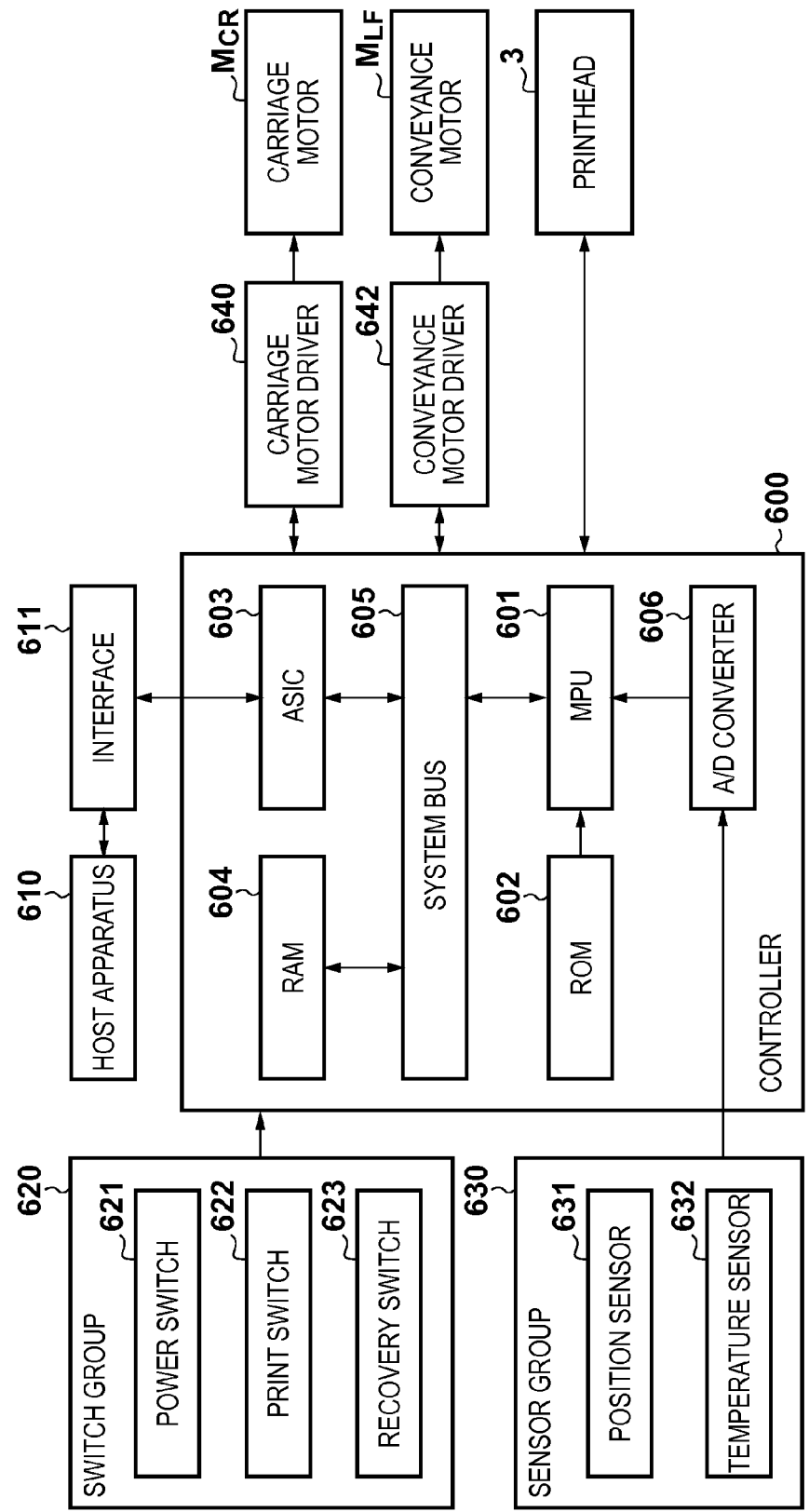
FIG. 2 is a block diagram exemplifying the functional arrangement of the printing apparatus.

FIG. 2 is a block diagram exemplifying the functional arrangement of the printing apparatus 1 shown in FIG. 1.

A controller 600 includes an MPU 601, ROM 602, application specific integrated circuit (ASIC) 603, RAM 604, system bus 605, and A/D converter 606. In the embodiment, the controller 600 serves as a driving control unit which controls driving of the carriage motor.

The ROM 602 stores programs corresponding to control sequences (to be described later), necessary tables, and other permanent data. The ASIC 603 controls the carriage motor $M_{CR}$ and a conveyance motor $M_{LF}$. Also, the ASIC 603 generates a control signal for controlling the printhead 3. The RAM 604 is used as an image data rasterization area, a work area for executing a program, and the like. In the embodiment, the RAM 604 serves as a storage unit which stores a correction value (details of which will be described later) generated to correct driving of the carriage motor $M_{CR}$. The system bus 605 connects the MPU 601, ASIC 603, and RAM 604 to each other to exchange data. The A/D converter 606 A/D-converts an analog signal input from a sensor group (to be described later), and supplies the converted digital signal to the MPU 601.

A switch group 620 includes a power switch 621, print switch 622, and recovery switch 623. A sensor group 630 is used to detect an apparatus state, and includes a position sensor 631 and temperature sensor 632.

In print scanning by the printhead 3, while directly accessing the storage area of the RAM 604, the ASIC 603 transfers, to the printhead 3, data for driving printing elements (heaters).

A carriage motor driver 640 drives the carriage motor $M_{CR}$. A conveyance motor driver 642 drives the conveyance motor $M_{LF}$. The printhead 3 is scanned in a direction (to be referred to as a scanning direction hereinafter) perpendicular to the conveyance direction of the printing medium P. More specifically, the printhead 3 is scanned relatively to the printing medium.

A computer (or a reader for reading an image, a digital camera, or the like) 610 serves as an image data supply source, and is generically called a host apparatus, or the like. The host apparatus 610 and printing apparatus 1 exchange image data, commands, status signals, and the like via an interface (I/F) 611.

<Arrangement of Conventional Motor Driving Apparatus>

Figure 3:
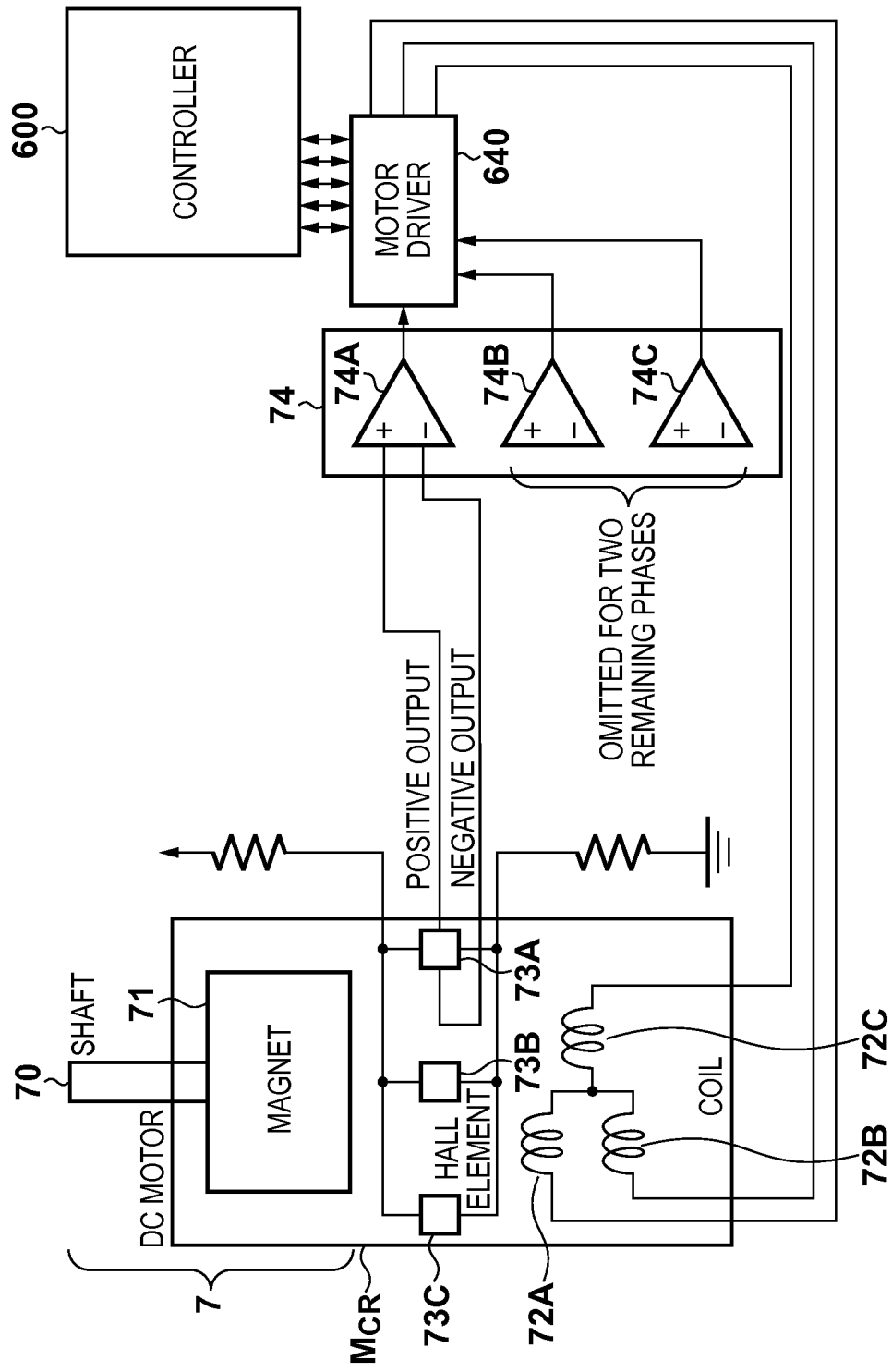
FIG. 3 is a conceptual view showing a related art.

The arrangement of a conventional motor (DC brushless motor) driving apparatus will be described with reference to FIG. 3.

A rotor 7 is configured by integrally forming the shaft member 70 serving as a rotating shaft and a magnet 71. A stator (not shown) supports the rotor 7 to be rotatable about the shaft member 70 serving as the center (that is, the shaft member 70 exists on the rotating shaft of the rotor 7). As described in the overall arrangement, in the ink-jet printing apparatus, the outer surface of the shaft member 70 of the carriage motor $M_{CR}$ is in contact with the pulley 8 to reciprocally drive the carriage 2 via a belt. In the carriage motor $M_{CR}$, a plurality of coils are arranged at equal intervals around the rotating shaft. Note that the motor exemplified here includes coils 72A, 72B, and 72C, corresponding to three phases. The power application destination is sequentially switched between these coils to rotate the rotor. Further, three Hall elements 73A, 73B, and 73C, are arranged at equal intervals around the rotating shaft of the rotor, as detection units which detect a magnetic field changing along with rotation of the magnet 71 (rotor), convert it into a voltage, and output the voltage. Hall elements 73A, 73B, and 73C respectively output analog voltage. Voltages from the positive and negative outputs of the respective Hall elements are output to differential amplifiers 74A, 74B, and 74C serving as binarization units arranged in a power application control unit 74 which changes the power application timing of a current to be supplied to a plurality of coils via the motor driver. Note that the number of Hall elements is not limited to three and may be two, or four or more, as long as a plurality of Hall elements are arranged.

Each differential amplifier compares the positive and negative outputs, and outputs a value H if the positive output is larger than the negative output, and a value L if the negative output is larger than the positive output (that is, the voltage difference (differential output) between the positive and negative outputs is binarized by 0 V (first threshold)). The motor driver 640 receives the value, and determines a combination of outputs (H or L) from the three differential amplifiers 74A, 74B, and 74C (for example, for a combination of H, L, and L, power is applied from the U-phase coil to the V-phase coil). The motor driver 640 always supplies a current to one of a plurality of coils. In correspondence with the combination, the motor driver 640 switches the power application phase between the coils 72A, 72B, and 72C in the motor, thereby rotating the rotor 7. That is, the motor driver 640 switches the power application destination between the coils at a rotation angle at which the positive and negative outputs become equal to each other in each phase ("switch a current to be applied to the coil" will be referred to as "commutate" hereinafter). Depending on the arrangement, the differential amplifiers 74A, 74B, and 74C are arranged in the motor driver 640.

Depending on the motor driver arrangement, the differential amplifiers 74A, 74B, and 74C are incorporated in the driver 640, or an output stage to the coils is formed from an external circuit. The motor driver 640 is connected to the controller 600 which controls the overall printing apparatus. The motor driver 640 receives signals from the controller 600, including a start/stop signal, rotational direction switching signal, abnormality detection signal, Hall signal-based simple speed signal, and PWM instruction signal. In other words, the controller 600 controls the speed of the carriage motor $M_{CR}$ in cooperation with various other operations (for example, conveyance motor $M_{LF}$) of the printing apparatus.

As described above, the Hall element detects a rotational position relative to the rotor, and does not detect an absolute position. In this arrangement, therefore, if the mounting position of the Hall element shifts, the commutation timing shifts, generating large torque discontinuity. Also, variations of the input offset voltages of the differential amplifiers 74A, 74B, and 74C, which binarize differential outputs from the Hall elements 73A, 73B, and 73C, greatly affect the commutation timing. A carriage motor according to the embodiment which cancels a coil commutation timing shift arising from these variations to improve the motor operation accuracy will be explained below.

<Arrangement of Motor Driving Apparatus in Embodiment>

Figure 4:
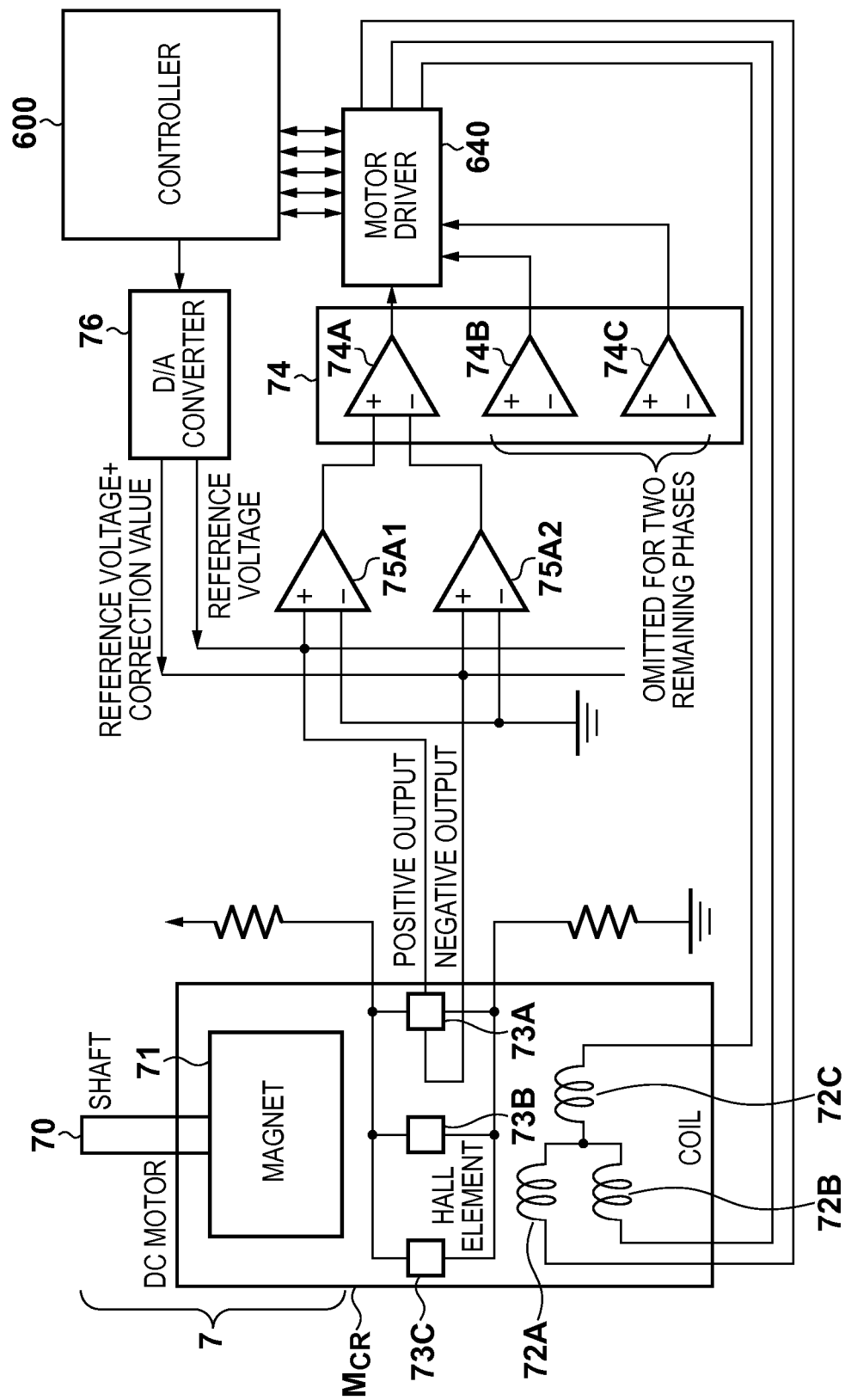
FIG. 4 is a conceptual view showing the present invention.

FIG. 4 shows the arrangement of a motor driving apparatus according to the embodiment. A difference of the arrangement of the embodiment from that of the conventional motor driving apparatus shown in FIG. 3 will be described.

Hall elements 73A, 73B, and 73C respectively output analog voltage. The positive and negative outputs of each of the Hall elements 73A, 73B, and 73C are connected via resistors to the inputs of separate additional operational amplifiers (addition units). For example, in FIG. 4, the positive and negative outputs of the Hall element 73A are connected to the inputs of additional operational amplifiers 75A1 and 75A2, respectively. The remaining Hall elements 73B and 73C, corresponding to two phases, are connected in the same fashion as the Hall element 73A. A description and illustration of these two phases will be omitted.

A D/A converter 76 having analog outputs of two or more channels is connected to the controller 600 which performs each device control. The outputs of the D/A converter 76 are connected to the input terminals of the additional operational amplifiers 75A1 and 75A2.

In accordance with an instruction from the controller 600, the additional operational amplifier 75A1 receives a reference voltage, and the additional operational amplifier 75A2 receives a voltage obtained by adding the reference voltage and a correction value (the obtaining method will be described in <Correction Value Calculation Method>) stored in the RAM 604. The additional operational amplifier 75A1 inverts the reference voltage and adds it to the original positive output of the Hall element. The additional operational amplifier 75A2 inverts the reference voltage+correction value and adds them to the original negative output of the Hall element.

The additional operational amplifiers 75A1 and 75A2 are connected to the positive and negative input terminals of the differential amplifier 74A, respectively. This arrangement cancels the added same reference voltages, and differentially outputs only the correction value while the correction value is superimposed on one Hall element output.

<Hall Element Output in Conventional Motor>

First, a conventional motor will be explained. In the following description, (+, −) outputs from the Hall elements 73A, 73B, and 73C will be referred to as (Hu+, Hu−), (Hv+, Hv−), and (Hw+, Hw−), respectively.

In FIG. 5, the abscissa represents the rotation angle of the rotor 7. In this example, the magnet has an octupole arrangement, and when the rotor 7 rotates 45°, the north and south poles are switched. When this happens, H and L of the comparison operation output U with respect to Hu+ and Hu− change (in FIG. 5, H for Hu+>Hu−, and L for Hu+<Hu−). The waveforms of Hu+ and Hu− shift by −2.5° along the abscissa. The comparison operation output U should originally change at rotor rotation angles of 45° and 90°, but changes at positions of 42.5° and 87.5° in FIG. 5. This considers a state in which various errors are piled up, including the mounting position error of the Hall element and the fixed position error of the circuit board.

Figure 6:
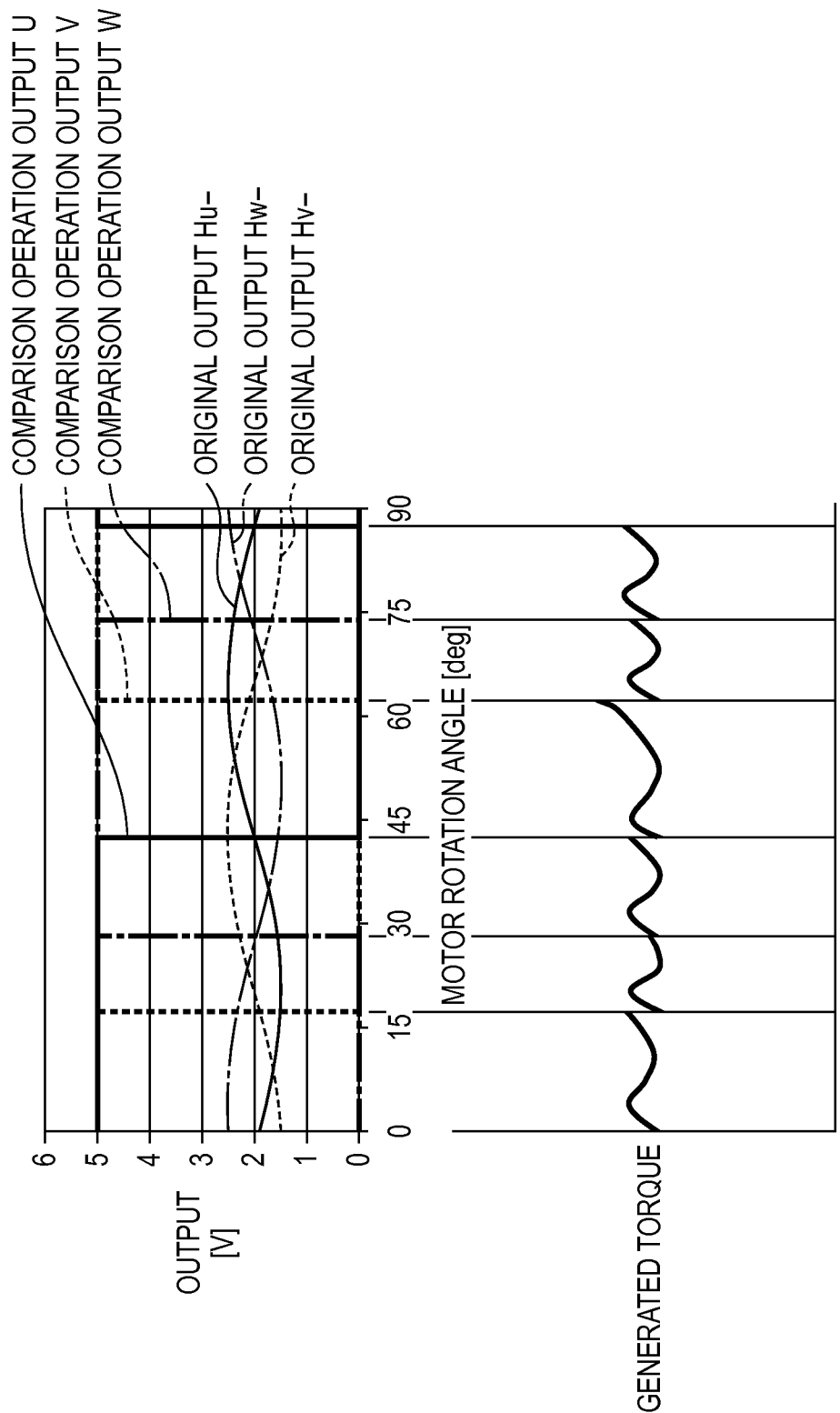
FIG. 6 is a waveform chart showing a conventional Hall element output and generated torque (three-phase display)

FIG. 6 is a waveform chart showing negative outputs when the remaining Hall elements are also mounted with shifts. In FIG. 6, a solid line represents the output Hu− of the Hall element 73A, and an actual waveform shifts from an original waveform along the abscissa, as described above. A broken line represents the output Hv− of the Hall element 73B, and a chain line represents the output Hw− of the Hall element 73C. These waveforms also shift from ideal waveforms. In this example, the original positive and negative outputs of the Hall element have vertically symmetrical waveforms with respect to +2.0 V. Thus, the comparison operation outputs U, V, and W are compared at positions crossing +2.0 V.

The motor driver 640 supplies a current to target coils based on a combination of the binary signals U, V, and W. If the position where the value changes shifts, the timing of commutation to the coil shifts. As a result, a torque having large discontinuous parts is generated as shown in a torque generation conceptual view on the lower stage. This becomes a cause of vibrations of the carriage that cannot be completely reduced. In FIG. 6, a 100% PWM driving duty state is explained for simplicity. In actual driving, PWM driving is superimposed on this basic commutation waveform.

<Hall Element Output in Embodiment>

Figure 7:
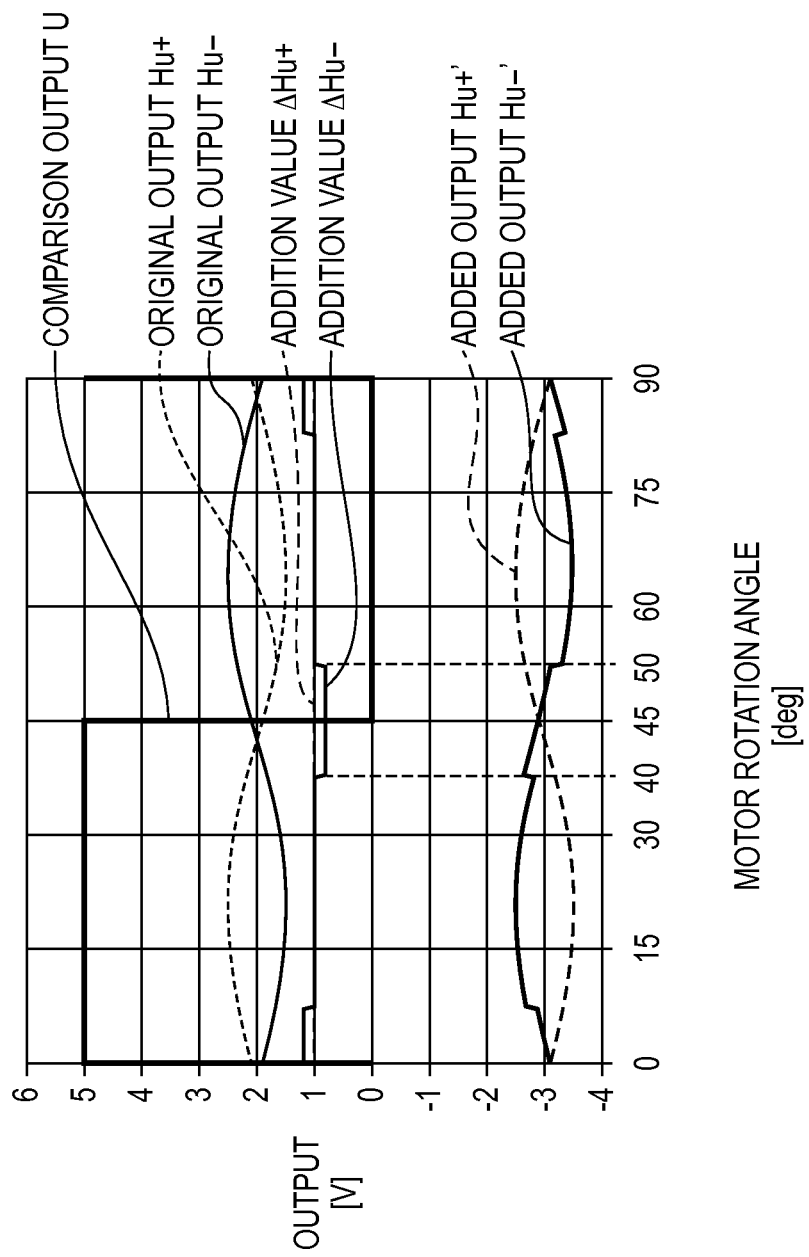
FIG. 7 is a waveform chart showing a correction example of a Hall element output according to the embodiment of the present invention (one-phase display)

FIG. 7 shows a case in which the waveforms of the original outputs Hu+ and Hu− shift by −2.5° along the abscissa, similar to the above-described case. In the embodiment, the controller 600 monitors the commutation timing of the motor driver 640 to calculate a shift of an actual waveform from an ideal waveform. As a result of this calculation, the controller 600 calculates a correction value (the obtaining method will be described in <Correction Value Calculation Method>) to be added to Hu− in order to change the comparison operation output U at ideal rotation angles (45° and 90°). The calculated correction value is stored in the RAM 604, and output as a digital signal from the RAM 604 to the D/A converter 76. Of two outputs from the D/A converter 76, one (Hu+ side in the embodiment) is a given reference voltage (1 V in the embodiment) ΔHu+. The other output (Hu− side in the embodiment) is a voltage ΔHu− obtained by adding the correction value to the reference voltage. These values are input to the additional operational amplifiers 75A1 and 75A2 serving as calculation units, inverted, and added to the original Hall element outputs Hu+ and Hu−, outputting output values Hu+' and Hu−'. That is, (Hu+')=−{(Hu+)+(ΔHu+)}, and (Hu−')=−{(Hu−)+(ΔHu−)}. The difference between the output values Hu+' and Hu−' is calculated. Accordingly, the zero-crossing positions of the original Hall element differential outputs change from a rotor rotation angle of 42.5° to 45° and from a rotor rotation angle of 87.5° to 90°. The obtained addition result outputs can change the comparison operation output U between H (Hu−'>Hu+' in the embodiment) and L (Hu+'>Hu−' in the embodiment) at ideal rotation angles. The motor driver 640 performs commutation based on the obtained value of the comparison operation output U. As outputs from the D/A converter, one is the reference voltage and the other is the reference voltage+ correction value. However, the correction value can be distributed to the two outputs to adjust the commutation timing. The correction value is added in a section containing the zero-crossing position (rotation angle at which the differential output reaches the first threshold (−3 V in FIG. 7), the motor rotation angle is 45°) of each differential output. For example, the correction value is added in a range of predetermined angles (40° to 50°). In the remaining section, the correction value may not be added. Note that the correction value is constant.

As a method of monitoring the commutation timing, in addition to the embodiment, the commutation timing can be calculated from a synthesized output obtained by synthesizing binary Hall output signals of three phases in accordance with an output from the driver 640. The commutation timing can also be calculated by directly inputting binary Hall element signals to the controller 600.

Figure 8:
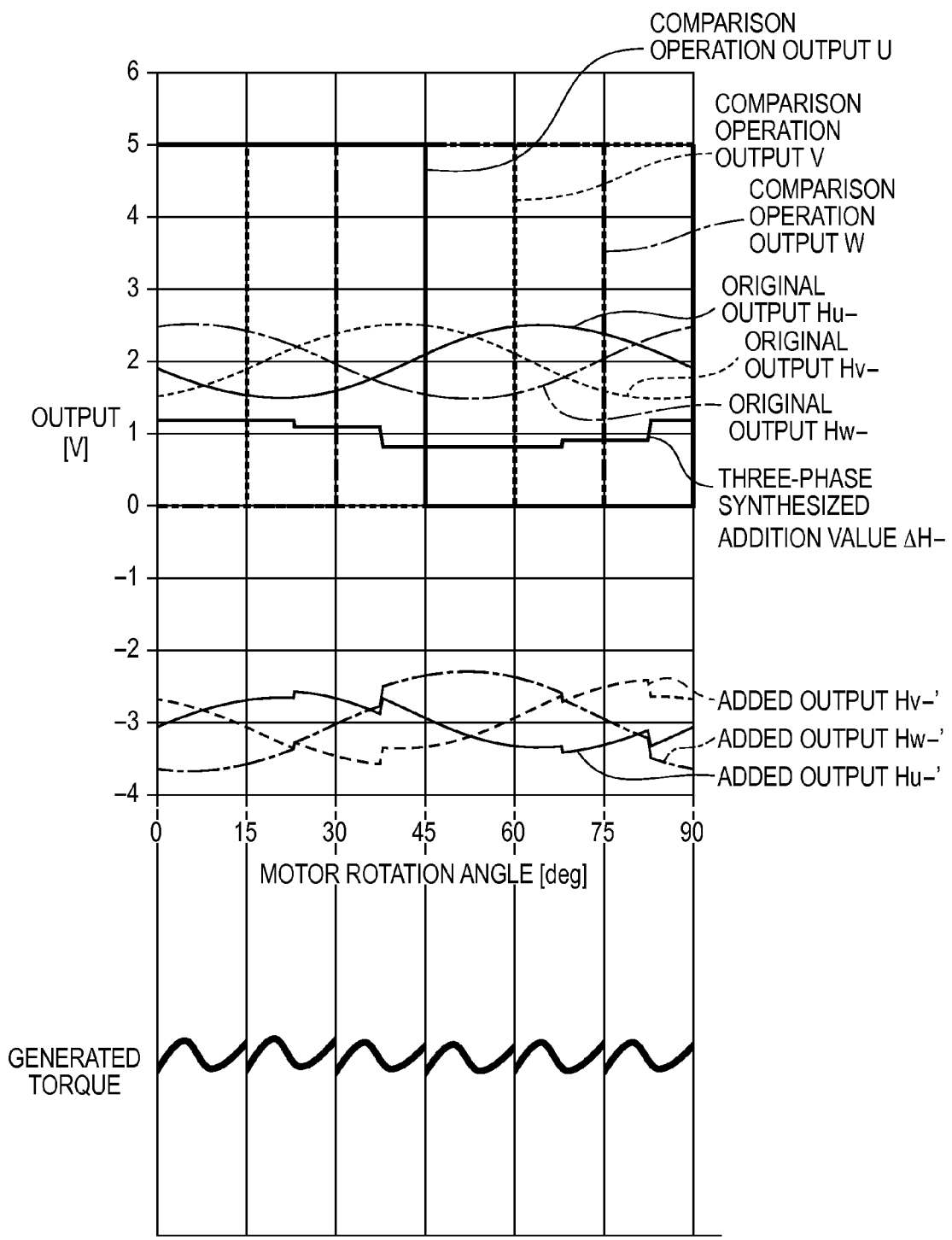
FIG. 8 is a waveform chart showing a corrected Hall element output and generated torque (three-phase display)

FIG. 8 shows a three-phase example in which control signals for U, V, and W are superimposed. The comparison positions of the respective Hall elements are spaced apart from each other at an electrical angle of 120°, and the absolute value of the Hall element output is larger than the correction value. Thus, the addition values ΔH− for the three Hall elements can be appropriately switched based on the rotor position. That is, corresponding correction values can be applied in sections containing actual zero-crossing positions closest to the ideal zero-crossing positions of respective differential outputs for the Hall elements 73A, 73B, and 73C. Further, the same correction value can be simultaneously added via one signal line to outputs from the three Hall elements. This arrangement can decrease the number of D/A converters.

In FIG. 8, a thick line represents a three-phase synthesized addition value ΔH−. The correction value changes at positions of about 7.5°, 22.5°, 37.5°, 52.5°, 67.5°, and 82.5° to switch the Hall element correction value at rotor positions of 15°, 30°, 45°, 60°, 75°, and 90°. The additional operational amplifier 75A2 inverts the three-phase synthesized addition value ΔH− and adds it to the original negative outputs Hu−, Hv−, and Hw−, outputting added output values Hu−', Hv−', and Hw−'. Although not shown, the additional operational amplifier 75A1 inverts the reference voltage (constant at 1 V in this example) from the D/A converter, and adds it to the original positive outputs Hu+, Hv+, and Hw+ in the same way. Both the positive and negative outputs are about −3 V. As a result of the differential operation, only the difference between two outputs from the D/A converter is added to the Hall element differential output, correcting the detection position. As shown in a generated torque conceptual view on the lower stage of FIG. 8, a torque is generated at uniform position intervals with respect to the rotor position, torque ripples decrease, and vibrations can be reduced.

Although not shown, a plurality of D/A converters can be prepared individually to perform correction for the respective Hall elements.

<Correction Value Calculation Method>

Figure 9:
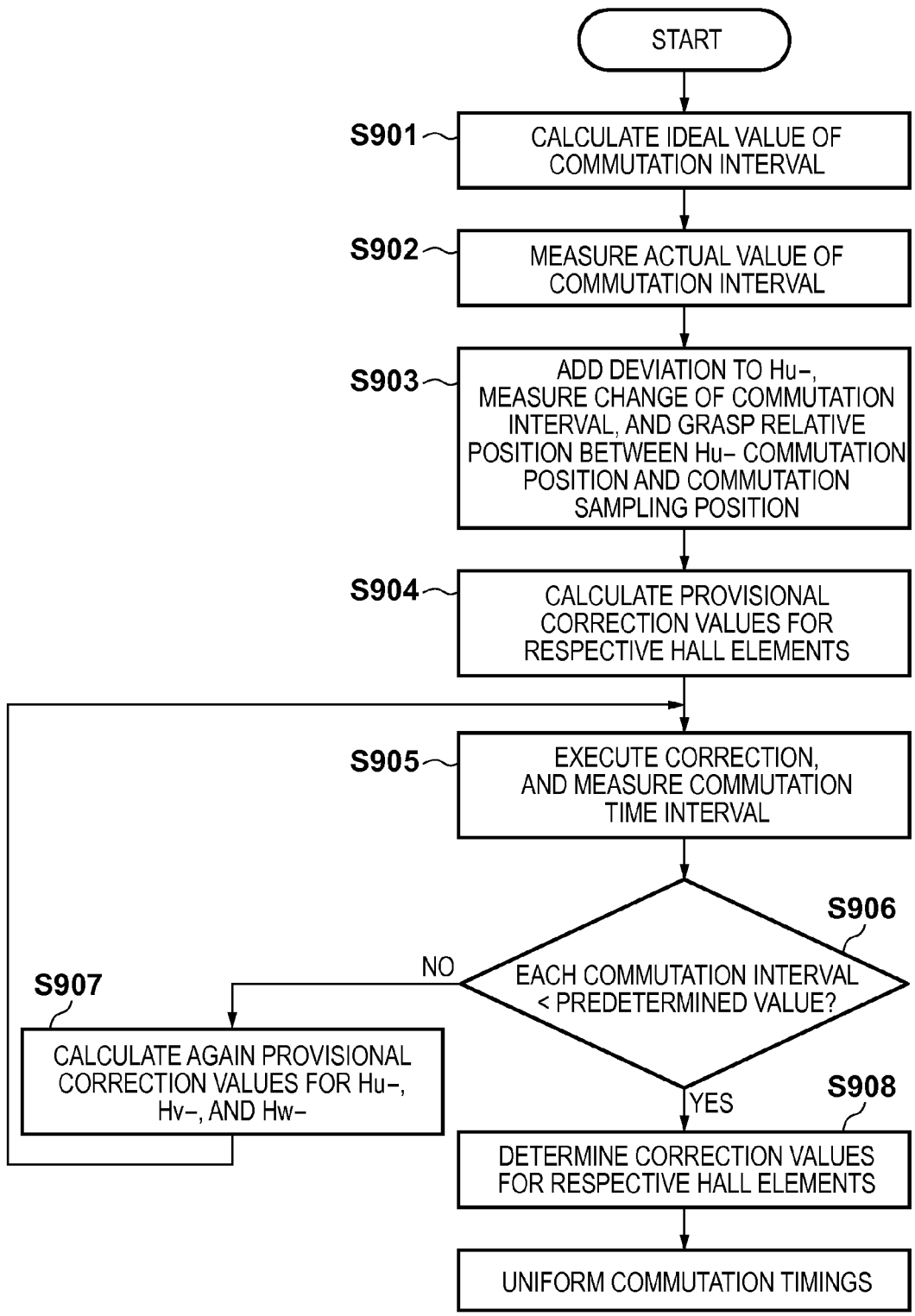
FIG. 9 is a sequence chart showing determination of a correction value.

Processing of calculating a correction value and performing correction in the apparatus will be explained with reference to the sequence chart of FIG. 9.

First, the controller 600 sends a control signal to the motor driver 640 to rotate the carriage motor at a predetermined rotational speed, and rotates the carriage motor via the motor driver. Then, in step S901, the controller 600 calculates an interval at which the motor driver 640 performs commutation when the carriage motor rotates ideally at a predetermined rotational speed based on the control signal. In step S902, the controller 600 measures an actual rotor rotation angle at which the motor driver 640 actually performs commutation, and acquires the measured value. In step S903, the controller 600 adds a deviation to Hu− for one cycle of commutation, measures a change of the commutation interval, and detects the relative position between the commutation position after addition and the sampled commutation position. Based on the result obtained in step S903, in step S904, the controller 600 obtains provisional correction values to be added for the three Hall elements in accordance with the difference between the target interval and the switching interval. In step S905, the controller 600 adds the provisional correction values to the respective Hall element outputs Hu−, Hv−, and Hw− to correct the outputs. After that, the controller 600 measures the commutation interval (switching interval) again. If the absolute value of the difference between the target interval and the switching interval is equal to or larger than a predetermined value in step S906, the controller 600 calculates again provisional correction values in step S907. In step S905, the controller 600 executes correction again, acquiring the measured value of the switching interval of the motor driver 640. This processing is repeated until the absolute value of the difference becomes equal to or smaller than the predetermined value. After the end of repeating the processing, the controller 600 advances to step S908 to determine provisional correction values at this time as correction values.

That is, the above processing can obtain a value (correction value) for canceling the difference between a voltage change (ideal value) from the Hall element that corresponds to a motor rotation angle that is expected when the carriage motor rotates ideally based on a control signal, and an actually obtained voltage change (actually measured value). As the correction value calculation method, an arrangement in which the controller 600 directly monitors a voltage waveform from the Hall element can also be taken.

Further, the correction value can be a difference between the ideal value and actually measured value of a voltage from the Hall element at an ideal zero-crossing position in a section containing an actual zero-crossing position closest to the ideal zero-crossing position of each of the differential outputs for the Hall elements 73A, 73B, and 73C.

The obtained correction value is stored in the RAM 604, and added to an output from the Hall element via the D/A converter 76 in the carriage motor operation. Once the correction value is obtained, even if the rotational speed of the rotor changes, the correction value can be obtained without executing the above processing again.

Effects of Embodiment

By the above arrangement, once the correction value is obtained, even if the rotational speed changes, it is unnecessary to measure the commutation timing or predict the correction value again. The correction value serves as a function of the rotation angle of the motor. In the printing apparatus, even upon the shift of the mounting position of the Hall element itself, or in a driving form in which acceleration and deceleration are repeated frequently, the motor operation accuracy can be improved by correcting a driving error and switching power application to each coil at an ideal rotation angle.

Another Embodiment

Figure 10:
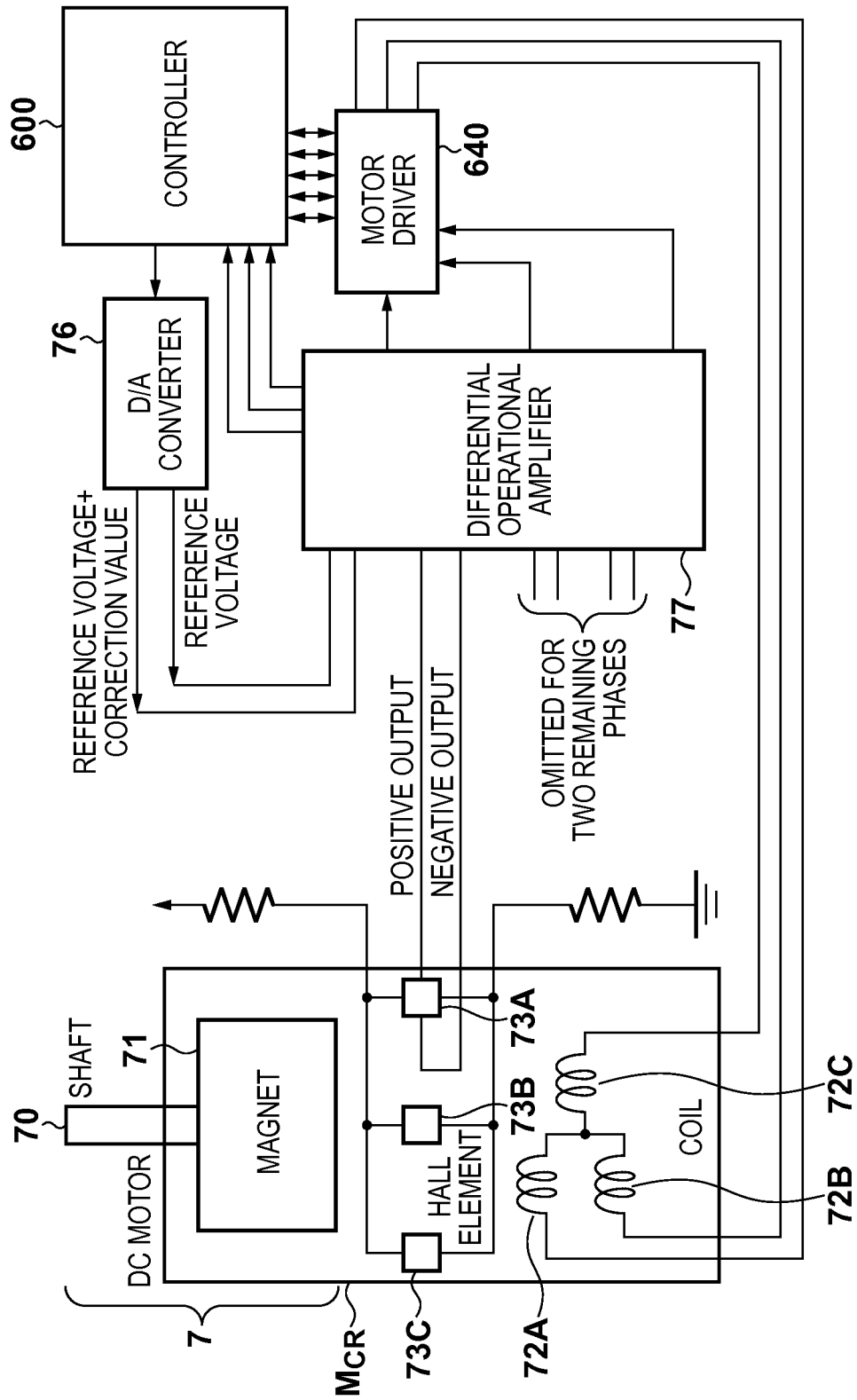
FIG. 10 is a conceptual view showing another embodiment of the present invention.

FIG. 10 is a view showing an arrangement in which correction amounts to be added to three phases are switched based on the rotor rotation angle. In this embodiment, the positive and negative outputs of respective Hall elements incorporated in a CR motor are input to a differential operational amplifier 77 serving as an operation unit which performs a series of operations. Similar to the above embodiment, the differential operational amplifier 77 adds an output from a D/A converter 76 to outputs from Hall elements 73A, 73B, and 73C, binarizes the difference values between the outputs, and outputs the binary values to a motor driver 640.

In the embodiment, differential operations between the respective Hall elements (Hu–Hv differential operation, Hv–Hw differential operation, and Hw–Hu differential operation) are performed, and the binary differential signals are input to a controller 600. The controller 600 uniquely determines the switching position of a correction value to be added from the binary differential signals, details of which will be described below.

Figure 11:
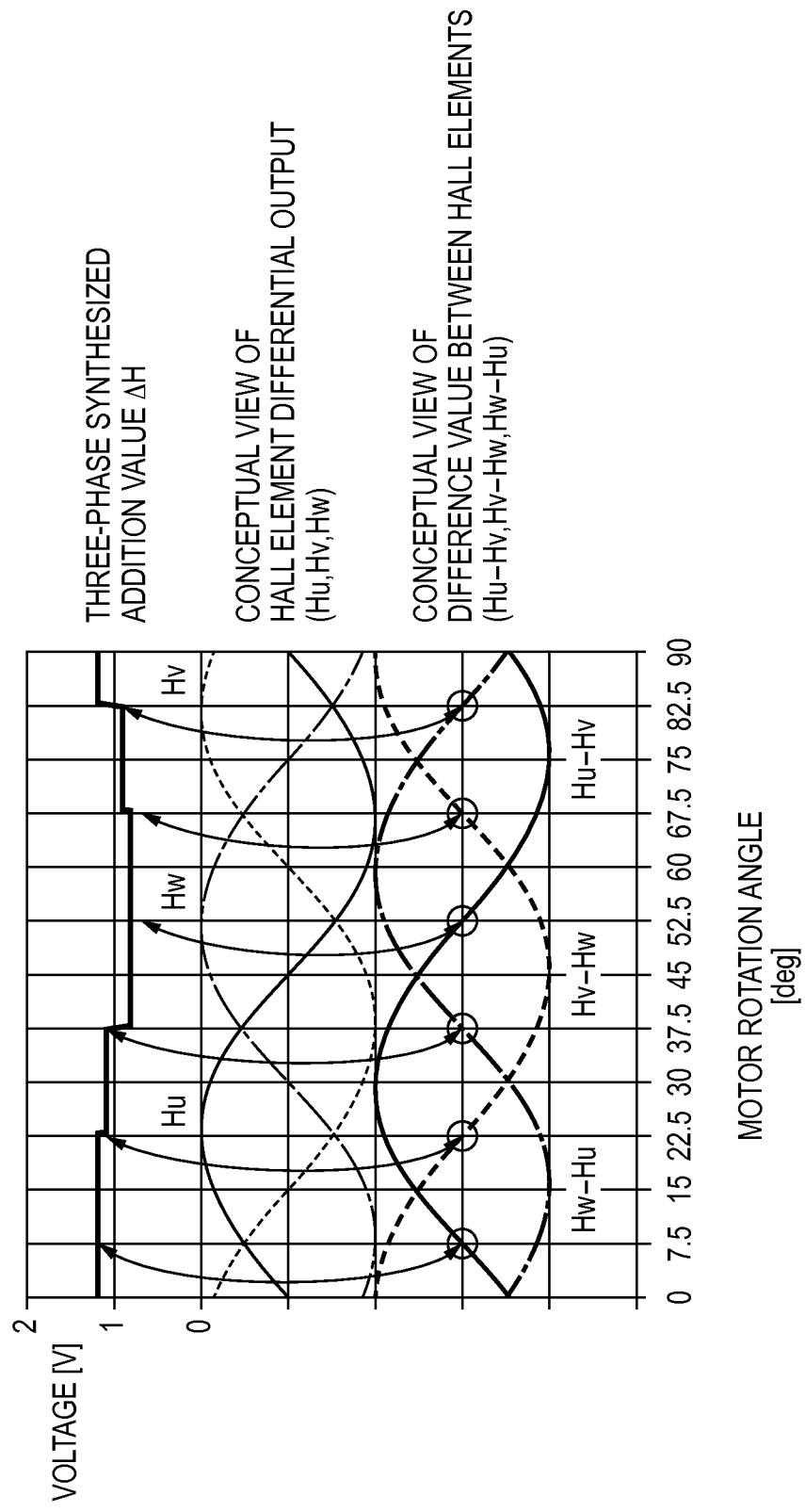
FIG. 11 is a waveform chart showing the waveforms of differential outputs from Hall elements, the waveforms of differential signals between the outputs, and the waveform of a target three-phase synthesized correction value.

FIG. 11 shows the waveforms of differences Hu, Hv, and Hw between the positive and negative outputs of the respective Hall elements, the waveforms of difference values Hu–Hv, Hv–Hw, and Hw–Hu between the respective outputs, and the waveform of a target three-phase synthesized correction value. When attention is paid to Hu, zero-crossing positions are ideally rotation angles of 0°, 45°, and 90°. Ideal zero-crossing positions are 15° and 60° for Hv, and 30° and 75° for Hw. When there are four or more Hall elements, a value obtained by subtracting a downstream differential output from an upstream differential output in a predetermined direction (rotational direction or reverse rotational direction of the rotor) in a pair of two adjacent Hall elements is calculated as a differential value.

Considering difference values between outputs, zero-crossing positions are 7.5° and 52.5° for Hu–Hv, 22.5° and 67.5° for Hv–Hw, and 37.5° and 82.5° for Hw–Hu, as shown in FIG. 11. In the embodiment, the zero-crossing timing is used to switch the correction value. More specifically, the target three-phase synthesized correction value (addition value ΔH) serves as a correction value (addition value) for Hu, Hv, and Hw near the zero-crossing positions for Hu, Hv, and Hw. A method of obtaining a three-phase synthesized correction value will be described.

Figure 12:
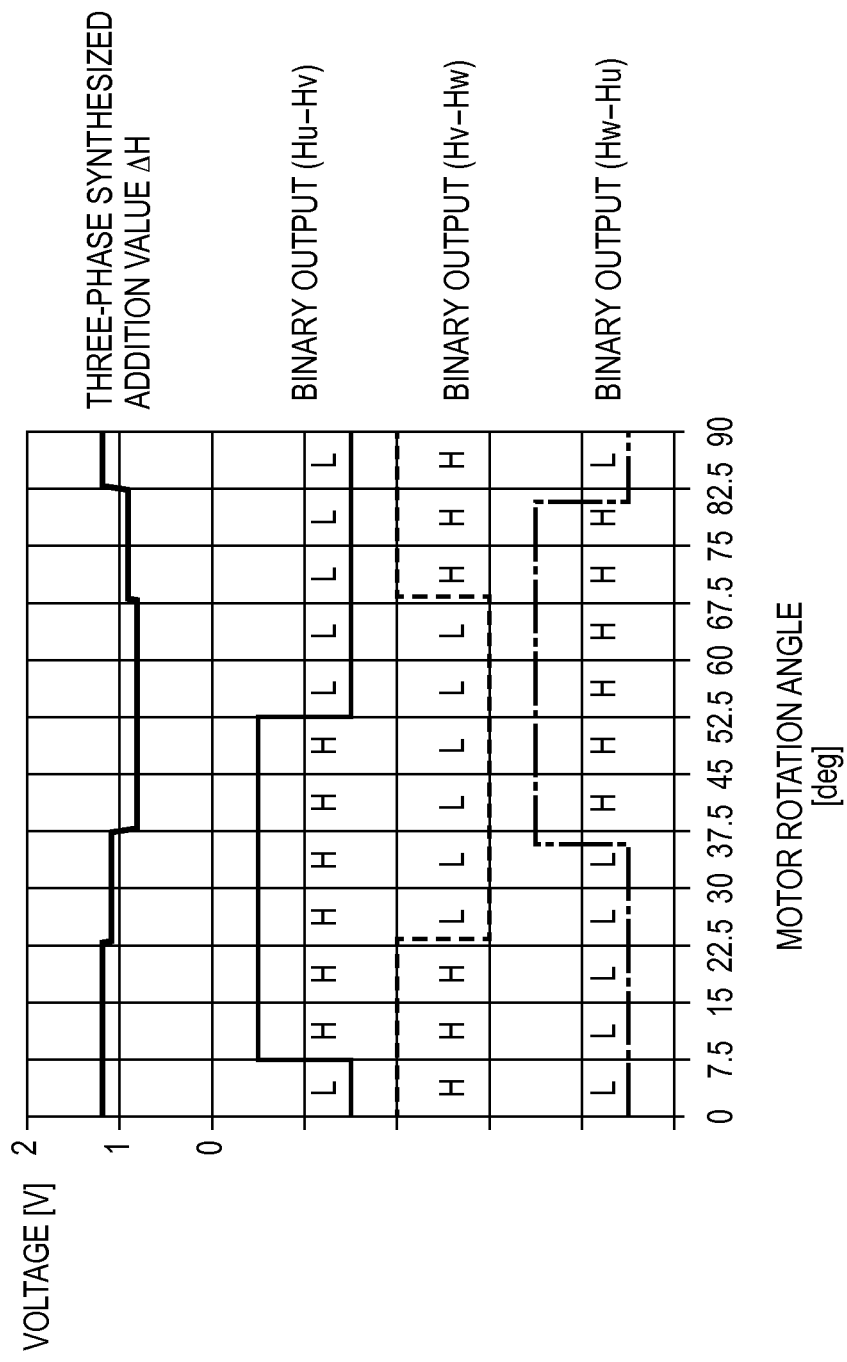
FIG. 12 is a waveform chart showing the waveforms of binary differential outputs between outputs.

FIG. 12 shows waveforms obtained by binarizing, by a threshold of 0 V (second threshold), the difference values Hu–Hv (solid line), Hv–Hw (broken line), and Hw–Hu (chain line) between the Hall elements shown in FIG. 11. Based on obtained combinations of H and L, it is determined which of the addition values ΔHu, ΔHv, and ΔHw is employed for each combination. For example, as shown in FIG. 11, the zero-crossing position (leading edge) of Hu is 0°. As shown in FIG. 12, Hu–Hv:Hv–Hw:Hw–Hu=L:H:L is obtained in a section of 82.5° to 7.5°. By adopting the addition value ΔHu for Hu when Hu–Hv:Hv–Hw:Hw–Hu=L:H:L, a corrected output Hu' can have a zero-crossing position at an original rotation angle) (0°). Similarly, by adopting ΔHv for Hu–Hv:Hv–Hw:Hw–Hu=H:H:L and then ΔHw for Hu–Hv: Hv–Hw:Hw–Hu=H:L:L, corrected outputs Hv' and Hw' can have zero-crossing positions at original rotation angles (15° and 30°. These difference values have a table of six combinations, a description of which will be omitted. A Hall element for which the correction value becomes effective can be uniquely determined from a combination of difference values between respective Hall element outputs.

An effect of the embodiment will be explained. In general, a rotor has a decentering component, and the primary component of one rotation of the rotor exists even if the magnetization accuracy is high. Changing the correction value through one round of the rotor can cope with even the decentering component. In an octupole 6-coil DC brushless motor, commutation is executed 24 times per round. Thus, by switching the correction value 24 times per round of the motor, correction can be achieved satisfactorily through one round of the rotor.

Modification to Embodiment

Figure 13:
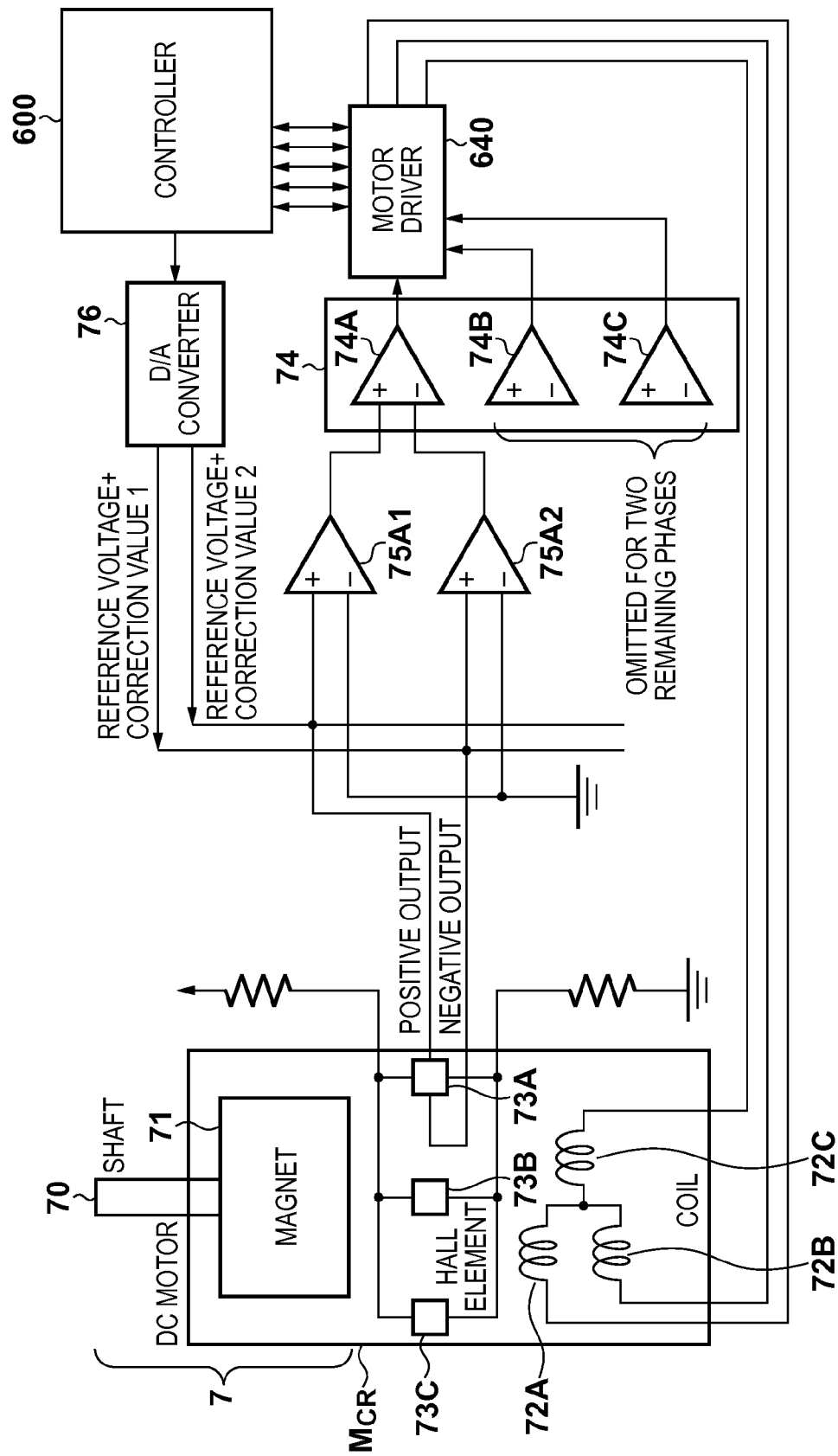
FIG. 13 is a conceptual view showing a modification to the embodiment of the present invention.

In FIG. 4, one output from the D/A converter is the reference voltage, and the other is the reference voltage+correction value. As a modification, as shown in FIG. 13, an arrangement in which one output from the D/A converter is the reference voltage+correction value 1 and the other is the reference voltage+correction value 2 to adjust the commutation timing is also possible.

In FIG. 4, one output from the D/A converter is the reference voltage, and the other is the reference voltage+correction value. Alternatively, addition of the reference voltage may be stopped in accordance with a circuit which processes a signal.

The Hall element itself has a hysteresis, and the differential amplifier also has a hysteresis for noise removal. For this reason, the timing of commutation by forward/reverse rotation of the rotor changes. Considering this, correction values are acquired individually in forward rotation and reverse rotation, taking appropriate measures for both of the rotations.

While an accurate correction amount is set, advancing driving can be easily performed based on this value in order to reduce the influence of coil inductance. Advancing is a means which performs commutation at a position earlier than the rotor rotation angle in accordance with the rotational speed to avoid the influence of coil inductance. Generally, an advancing phase is generated in the driving circuit to apply power. As a modification to the embodiment, advancing can be easily implemented by adjusting the zero-crossing position of a Hall element output. That is, advancing is achieved by adjusting a correction value to the Hall element in accordance with the rotational speed.

A brushless motor generally has a problem that a magnetic field excited on a coil affects a Hall element as an armature reaction to shift an original commutation position. Even this problem can be solved by monitoring a coil current and changing the correction amount in accordance with the current.

As described above, the embodiment of the present invention can employ various modifications. While avoiding structural complication, the motor operation accuracy can be improved by correction corresponding to the characteristics of various building elements.

Application of Embodiment

The embodiment has explained carriage driving of an ink-jet printer. However, the present invention is also applicable to a motor driving apparatus for conveying a printing medium as long as the commutation interval can be measured and calculated to provide a correction output in a general multiphase driving brushless motor. The present invention is applicable not only to an ink-jet printer but also to an electrophotographic printer and another device such as a scanner (image reading apparatus).

Other Embodiments

Aspects of the present invention can also be realized by a computer of a system or apparatus (or devices such as a CPU or MPU) that reads out and executes a program recorded on a memory device to perform the functions of the above-described embodiment(s), and by a method, the steps of which are performed by a computer of a system or apparatus by, for example, reading out and executing a program recorded on a memory device to perform the functions of the above-described embodiment(s). For this purpose, the program is provided to the computer for example via a network or from a recording medium of various types serving as the memory device (for example, computer-readable medium).

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2011-185248 filed on Aug. 26, 2011, which is hereby incorporated by reference herein in its entirety.

What is claimed is:

1. A motor driving apparatus comprising:
   a motor including coils of a plurality of phases, and a plurality of detection units that output voltages by detecting a magnetic field changing along with rotation of a rotor;
   a driving unit that drives said motor by switching a current supply destination between the coils of the plurality of phases based on a signal;
   a determination unit that determines a correction value based on a difference between a predetermined voltage corresponding to a rotation angle of the rotor and a voltage, output from at least one of the plurality of detection units, corresponding to the rotation angle of the rotor, and
   a generation unit that generates the signal based on voltages output from the plurality of detection units and the correction value.

2. The apparatus according to claim 1, wherein the determination unit determines the correction value for each of the plurality of detection units.

3. The apparatus according to claim 1, wherein said generation unit includes an addition unit that adds the correction value to the voltage output from the at least one of the plurality of detection units within a predetermined angle range containing a rotation angle corresponding to a threshold voltage.

4. The apparatus according to claim 1, wherein
   said motor includes at least three detection units, and
   a difference value between voltages output from two detection units adjacent in a rotational direction of the rotor out of the plurality of detection units is acquired, binarization processing is performed based on a threshold voltage for the difference value, and the signal is generated based on a result of the binarization processing based on the threshold voltage.

5. The apparatus according to claim 1, wherein
   each of the plurality of detection units outputs a first detection signal, and a second detection signal different in phase from the first detection signal, and
   said generation unit adds the correction value to the first detection signal.

6. The apparatus according to claim 1, wherein each of the plurality of detection units include a Hall element.

7. A printing apparatus comprising:
   a motor driving apparatus defined in claim 1;
   a printhead;
   a carriage that supports said printhead and is driven by a motor; and
   a control unit that controls said printhead and said motor driving apparatus.

8. A motor driving apparatus comprising:
   a motor including coils of a plurality of phases, and a plurality of detection units that output voltages by detecting a magnetic field changing along with rotation of a rotor;
   a determination unit that determines a correction value; and
   a driving unit that drives said motor by switching a current supply destination between the coils of the plurality of phases based on the correction value and voltages output from the plurality of detection units,
   wherein said determination unit determines the correction value by comparing changes of voltages output from the plurality of detection units.

* * * * *